April 2, 1935.   F. D. FORTE   1,996,104
WAVE DAMPING RESPONSE DEVICE
Filed Aug. 17, 1932   2 Sheets-Sheet 1

INVENTOR-
Frederick D. Forte
BY
Ramsey & Kent
his ATTORNEYS

April 2, 1935.  F. D. FORTE  1,996,104
WAVE DAMPING RESPONSE DEVICE
Filed Aug. 17, 1932  2 Sheets-Sheet 2

INVENTOR-
Frederick D. Forte
BY
Ramsey & Kent
his ATTORNEYS

Patented Apr. 2, 1935

1,996,104

UNITED STATES PATENT OFFICE 1,996,104

WAVE DAMPING RESPONSE DEVICE

Frederick D. Forte, Brooklyn, N. Y.

Application August 17, 1932, Serial No. 629,245

8 Claims. (Cl. 274—1)

The present invention relates broadly to wave damping devices and more especially to devices for electro-mechanical translating of frequencies within the audible range.

The present invention relates more especially to free damping of devices for electro-mechanical recording and reproduction of sound.

In the operating of electro-mechanical sound recording and reproducing devices, there is a tendency for the devices to distort the waves due to over-vibration of the moving parts. The present invention overcomes the difficulties of the known art by damping the waves under the influence of freely movable parts, and, therefore, the damping may be defined as a free damping in that the damping parts are freely movable.

More especially, the damping in the present case is accomplished by the flexible medium connected with a freely movable mass so that the damping operation does not distort the wave by over-damping where relatively high peaks occur.

While the preferred form of the invention is herewith shown and described, it is to be understood that the invention may be embodied in devices other than those herewith specifically disclosed. Therefore, the disclosure is to be understood as illustrative and not in the limiting sense.

Referring now to the drawings forming a part hereof:

The device herewith specifically illustrated is shown in the form of a recorder for phonograph records. It is to be understood, however, that by replacing a cutting knife or point with a reproducing point, the same apparatus may be used for reproduction of sound from a suitable record.

Figure 1:
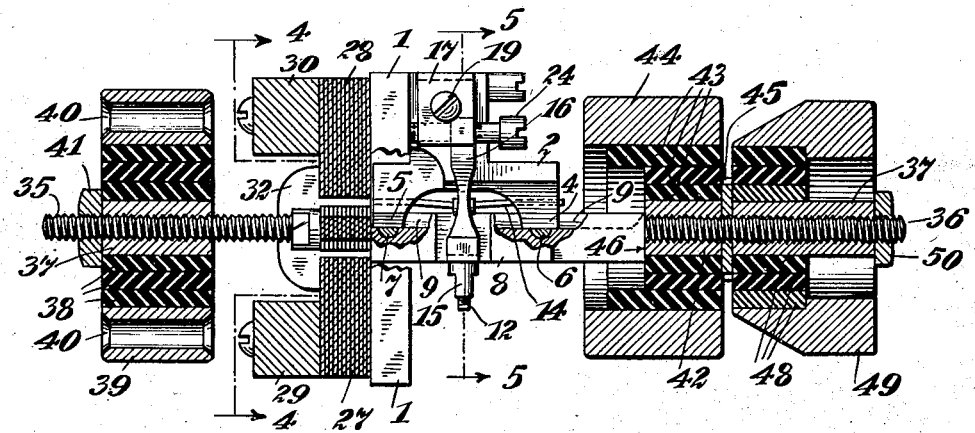
Fig. 1 is a more or less diagrammatic view illustrating the device as applied to recording mechanism for recording transverse waves on a phonograph record.

Referring more especially to Fig. 1, a frame 1 carries the operating parts and is adapted to be supported in a suitable way so that the parts may function over a record on which recording is made or over a reproducing record from which sound is to be produced.

The frame 1 carries a bracket 2 provided with knife edges 4 and 5. These knife edges may be of suitable construction, preferably of hardened steel with substantially a 60° angle to the face of the edges. These edges bear against hardened steel pins 6 and 7 mounted in the operating member 8 which is provided with a groove 9 to receive the knife edges 4 and 5, and the pins 6 and 7 preferably are likewise grooved in such manner that the knife edges rest in the bottom of the groove on the pins. The operating member preferably is of light weight material such as duralumin, and is provided with an arm 10 upon which the recording point 11 or reproducing needle is mounted.

Figure 2:
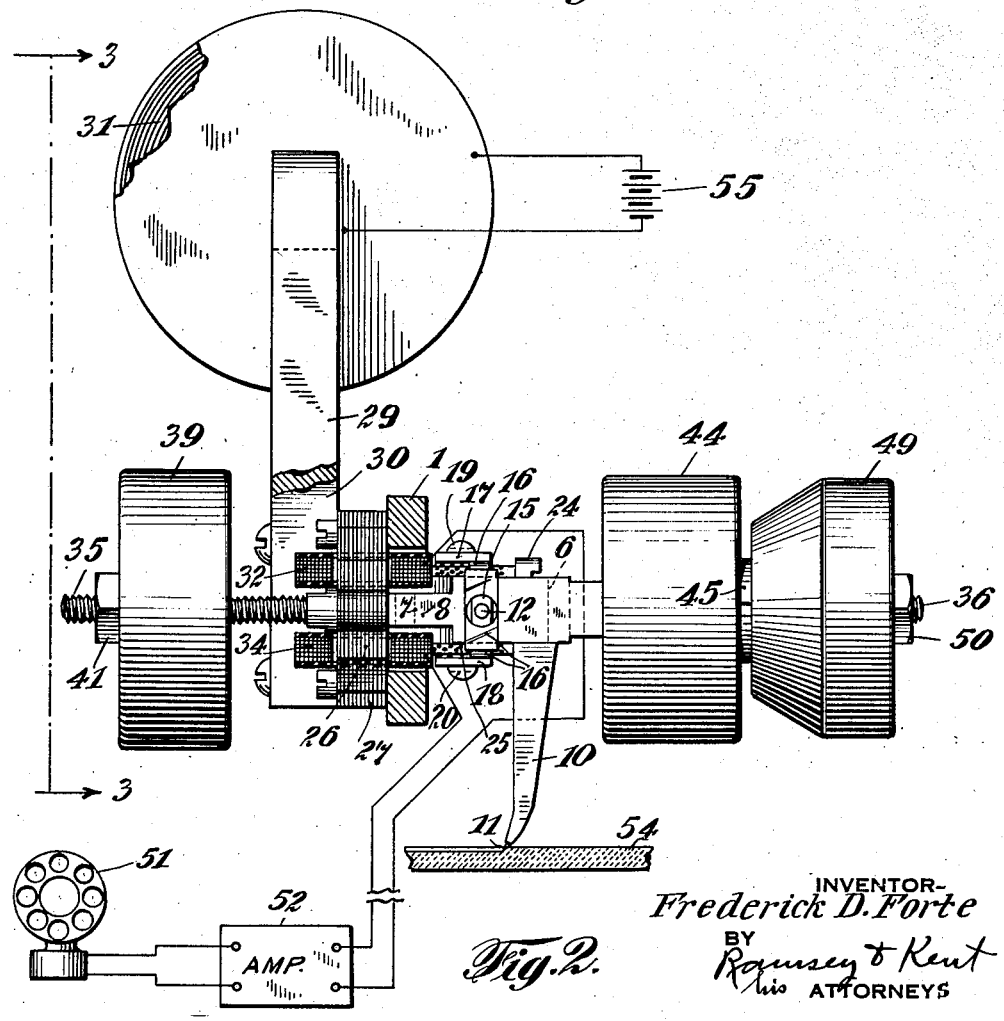
Fig. 2 is a plan view of the device shown in Fig. 1 with some of the parts shown in section to more clearly illustrate the structure.
Figure 3:
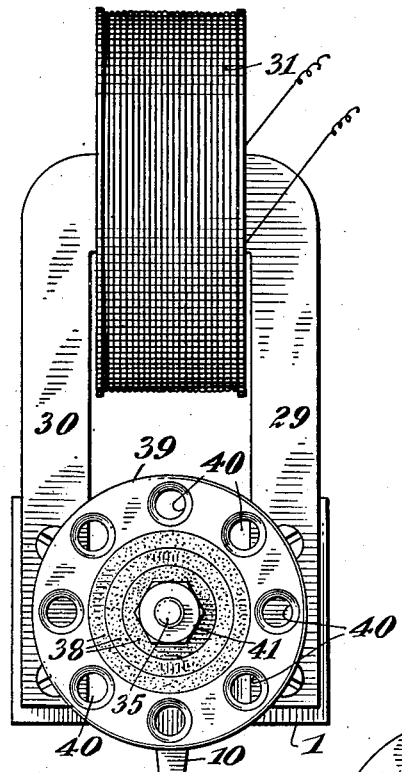
Fig. 3 is an end view of the device shown in Fig. 1 looking in the direction of the arrows on line 3—3 of Fig. 1.
Figure 4:
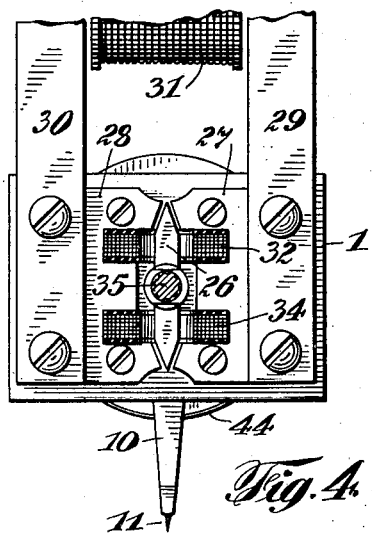
Fig. 4 is a sectional view on line 4—4 of Fig. 2.
Figure 5:
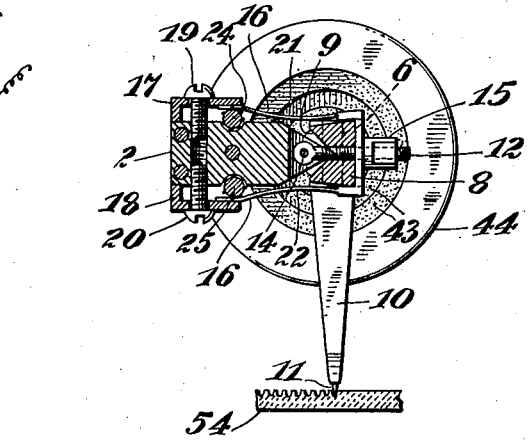
Fig. 5 is a sectional view on line 5—5 of Fig. 2.

The operating member 8 is held in position against the knife edges by means of a tension screw 12 (Figs. 1, 2, and 5) which is anchored on a resilient cross rod 14 carried by the knife edge members and the screw 12 extends through the operating member 8 to receive a nut 15. When the nut 15 is screwed down on the tension screw, the cross rod 14 bends sufficiently to resiliently press the knife edges 4 and 5 against the bearing pins 6 and 7. U-shaped spring 16 is looped over the operating member adjacent the tension screw 12 and is clamped to the bracket 2 by clamp plates 17 and 18 operated by screws 19 and 20. The sides of the U-shaped spring are preferably curved at 21 and 22, as shown in Fig. 5. Tension members 24 and 25 rest in openings in the bracket 2 and are in contact with the ends of the U-shaped spring 16. These tension members 24 and 25 are provided with screw heads and with the body of the members having longitudinally extending ribs or teeth so that by rotating these members 24 and 25, with the clamping plates 17 and 18 under slight tension, the ribs on the tension members bite into the ends of the U-shaped spring and thereby apply tension to the spring so that the parts may be locked under tension by tightening the screws 19 and 20. The curved portions 21 and 22 of the spring, however, admit of a slight rocking movement of the operating member 8 on the knife edge bearings. The operating member 8 extends through the frame 1 and carries an armature 26 (Figs. 2 and 4) which is securely locked on the operating member 8. This armature extends between pole pieces 27 and 28 which are preferably of laminated iron adapted to be energized magnetically. The poles 29 and 30 of an electro-magnet energized by a coil 31 are securely mounted over the pole pieces 27 and 28 in such manner that when a direct current is passed through the coil 31, the poles 29 and 30 are strongly magnetized and impart magnetism to the pole pieces 27 and 28 mounted on the frame 1. Small voice coils 32 and 34 are mounted in recesses in the pole pieces 27 and 28 and encircle the armature 26. When oscillating electrical currents are applied to the voice coils, the armature 26 oscillates and thereby oscillating the operating member 8 and the arm 10, carrying the recording point 11.

Where no dampening is provided, the oscillation is inclined to be of such character that the movement of the recording point is not a true representation of the electrical oscillation. This difficulty is overcome in the present case by dampening the movement of the operating member by freely movable parts, and in the preferred form, these parts comprise inertia members connected resiliently with the operating member 8. The preferred form of dampening device, as is illustrated in Figs. 1 to 5, comprises providing integral extensions of the operating member in the form of threaded shafts 35 and 36. The threaded shaft 35 carries a dampening member comprising a screw threaded hub 37 surrounded by concentric layers 38 of gum rubber, which support a lead ring or rim 39. This lead rim 39 is provided with a series of openings 40 which have the effect of providing the rim with spokes like a wheel. These openings 40 slightly reduce the mass of the rim 39 thereby changing the effective operation of the rim. The concentric layers of gum rubber are slightly under compression in such manner as to obviate any free movement to the rubber other than elasticity of the rubber, between the hub 37 and the rim 39. A lock nut 41 securely locks the dampening member against rotation on the shaft 35. The shaft 36 also carries dampening members, one of which comprises screw threaded hub 42 surrounded by concentric layers of gum rubber 43 and carrying a rim of lead 44. A lock nut 45 clamps the hub 42 against the shoulder 46 of the operating member 8. Another dampener is also mounted on the screw threaded shaft 36 by means of a hub 47 surrounded by concentric bands of gum rubber and these bands 48 likewise carry a rim 49 of lead. In this case, the rim 49 of lead takes the form of a conical member which extends beyond the concentric bands 48 of rubber. A lock nut 50 locks the outer dampener in place on the shaft 36. All of the dampening members are securely locked on their respective shafts against rotation so that when the operating member 8 is oscillated under the influence of the voice coils 32 and 34, a torsion is set up in the concentric rubber bands, due to the inertia of the lead rims. These lead masses 39, 44, and 49 are freely supported in such manner as to be movable providing the oscillations are of sufficient low rate to permit the inertia of the lead member to follow the oscillating movement. Over-vibration or "blasting" usually occurs in high pitched sounds and under these conditions, the freely movable lead masses have such inertia as to have little or no oscillatory movement during the operation of the device. Consequently, the dampening is effective to obviate "blasting" or other undesirable distortion of such high pitched tones. The freedom of the dampening operation is such that the dampening is uniformly effective throughout the tone range of audibility, and a faithful record or reproduction of the sound is thereby obtained.

As illustrated in Fig. 1, the device is shown as connected to the microphone 51 through an amplifier 52, and the recording point 11 is shown as cooperating with a record 54 in which a tone groove is being made. The device illustrated herewith is adapted more especially to cut a lateral groove record. It is to be understood, however, that by simply curving the arm 10 of one side of the axis of the operating arm 8, the device is immediately adapted for cooperation with hill and dale records. These changes are so obvious to one skilled in the art that they are not illustrated.

The electro-magnet coil 31 is illustrated as being energized by a suitable battery 55. It is to be understood that the device is to be suitably mounted in such manner that a relative movement occurs between the record 54 and the cutting point 11 in order to produce a proper groove in a record. These features are likewise well known to those skilled in the art and for reasons of simplification are omitted from the disclosure and description.

It is to be understood that where the device is used for reproduction of sound, the recording point 11 is interchanged with a suitable reproducing needle in such manner that the operation of the needle in the recording groove oscillates the operating member 8, thereby oscillating the armature 26 between the voice coils 32 and 34, consequently setting up in the voice coils oscillating electrical currents which are transmitted to suitable amplifying apparatus and to sound reproducing means such as a loud speaker.

Figures 6, 7:
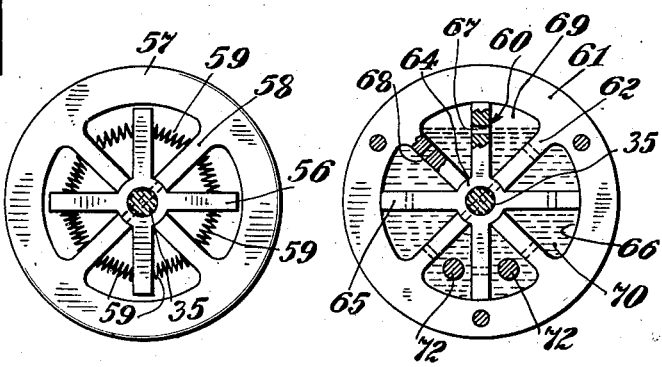
Fig. 6 is a modification of the damping element showing the utilization of springs.
Fig. 7 is a modification of the damping device showing a liquid container with one cover removed and wherein the damping is performed by liquid.

Fig. 6 illustrates a modification of the dampening device wherein the threaded shaft 35 carries a spider 56, and supports a weighted wheel or mass member 57 which is provided with arms 58. Spring members 59 extend between the arms 58 and the spider 56, so that when the operating member 8 oscillates, the oscillation is transmitted by the spider 56 to the spring members 59 and where the oscillation is of a low rate, it may be transmitted to the freely movable mass member 57. In this construction, the springs 59 replace the concentric gum rubber rings illustrated in the preferred form of the invention.

Figure 8:
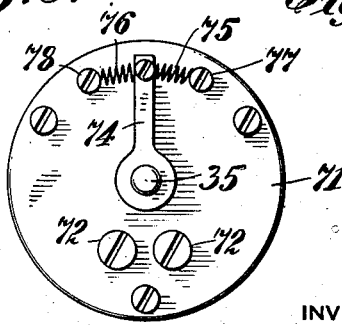
Fig. 8 is a view of an end view of the cover adapted for use with the device shown in Fig. 7 and illustrates a control member.

Figs. 7 and 8 illustrate a still further form of dampening device, wherein a spider piston 60 is mounted within a container mass wheel adapted to carry a liquid, preferably oil, which partly fills the container. Arms 62 integral with the container 61 are preferably sealed against the hub 64 to prevent substantial leakage of the liquid past the hub. Arms 65 on the spider are adapted to oscillate in pockets between the arms 62 on the container and the outer ends of the arms 65 are preferably sealed against the concentric walls of the pockets 66. The arms 62 on the container are preferably provided with openings 67 and the arms 65 on the container may be provided with openings 68. These openings form resistance means to the flow of the liquid when the spider, which is carried by either the shaft 35 or 36, is oscillated. Preferably, an air space 69 is provided above the liquid or oil 70. When the cover 71 is in place, compression screws 72 may be screwed into their respective pockets 66 in the container so that the ends of the screws 72 displace some of the liquid, thereby compressing the air sealed in the air space 69 and consequently, adjusting the sensitivity of the dampening member. In Fig. 8, which shows the cover 71 for the container member, is illustrated an arm 74, mounted against rotation on one of the extending shafts 35 or 36 of the operating member 8, with springs 75 and 76 connected to the arm 74 and with the ends of the springs 75 and 76 connected with adjustment screws 77 and 78 so that the tension on the springs 75 and 76 may be adjusted. The purpose of these springs 75 and 76 is twofold, first, to maintain arms 65 on the spider piston 60 in substantially the mid portion of the pockets 66, and secondly, the adjustment feature of the springs 75 and 76 permits a further adjustment of the sensitivity of the dampening. The openings 67 and 68 permits a distribution of pressure within the device so that pressure throughout the container is substantially equalized.

From the foregoing, it will be observed that the dampening operation in accordance with the present invention is a free damping in that the damping members are not rigidly coupled with any stationary device, but are freely moved with the operating member 8 and the damping occurs due to inertia as a resistance force against elastic members which are effective to properly dampen sounds which normally tend to be distorted by an undampened device. In the preferred form, a plurality of freely movable mass members of relatively small diameter are provided in order that the angular movement of these members will be relatively slight. Satisfactory results may be obtained, however, with a single mass member suitably connected with resilient means forming the connection between the mass and the vibrating member to be dampened.

Having described my invention, I claim:

1. A dampening device for a phonograph sound translating member comprising in combination, a member adapted to be oscillated in accordance with the sound waves to be translated, means to oscillate said member, a freely movable mass, the center of said mass being coincident with the axis of said member, and resilient yielding means connecting said freely movable mass to said translating member.

2. A dampened sound recorder or reproducer comprising in combination a member adapted to be oscillated in accordance with a sound wave concentric with the axis of said member, a freely movable weight, and dampening means operatively connected to said member and to said freely movable weight to comprise the sole support for said weight so that the inertia of said weight acts to render the dampening means effective on said member to dampen excessive vibrations thereof.

3. A dampened sound recorder or reproducer comprising a main control member adapted to be oscillated according to a sound wave; means to oscillate said member according to said sound wave, a heavy rim concentric with the axis of oscillation of said member, and a resilient gum hub connecting said rim with said member.

4. A dampened sound recorder or reproducer comprising a main bar adapted to be vibrated, means to vibrate said bar, and dampening means on each end of said bar, said dampening means comprising weighted rims and rubber hubs within said rims, said hubs being mounted on said bar.

5. A dampened sound recorder or reproducer comprising an operating bar, means to oscillate said bar according to a sound wave, a heavy rim mounted on each end of said bar, means to adjust said rims on said bar, and resilient means operatively connecting said rims with said bar.

6. A dampened sound recorder or reproducer comprising an operating member, means to vibrate said member according to a sound wave, a lead rim, and a plurality of concentric layers of gum rubber connecting said rim to said member.

7. A dampening device for a sound wave translating member comprising in combination, a member mounted for oscillation on a longitudinal axis in accordance with the sound wave to be translated, a mass concentric with the axis of oscillation of said member, and resilient means mounted on said member concentric with the axis of oscillation and attaching said mass to said member and forming the sole support for said member, whereby the inertia of said mass acts as a resistance to the movement of said resilient means to dampen the movement of said member against excessive oscillations.

8. A dampened sound recorder or reproducer comprising in combination, vibration means adapted to be vibrated in accordance with a sound wave, and a dampener comprising a weighted rim and elastic means connecting the said rim to said vibration means.

FREDERICK D. FORTE.